(12) United States Patent
Qian et al.

(10) Patent No.: US 11,340,634 B2
(45) Date of Patent: May 24, 2022

(54) SYSTEMS AND METHODS FOR HEIGHT CONTROL OF A MOVABLE OBJECT

(71) Applicant: SZ DJI TECHNOLOGY CO., LTD., Shenzhen (CN)

(72) Inventors: Jie Qian, Shenzhen (CN); Cong Zhao, Shenzhen (CN); Xuyang Feng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 299 days.

(21) Appl. No.: 16/399,497

(22) Filed: Apr. 30, 2019

(65) Prior Publication Data

US 2019/0258277 A1   Aug. 22, 2019

Related U.S. Application Data

(63) Continuation of application No. PCT/CN2016/104347, filed on Nov. 2, 2016.

(51) Int. Cl.
| | | |
|---|---|---|
| *G05D 1/12* | (2006.01) | |
| *B64C 39/02* | (2006.01) | |
| *G05D 1/00* | (2006.01) | |
| *G05D 1/02* | (2020.01) | |
| *G05D 1/04* | (2006.01) | |

(Continued)

(52) U.S. Cl.
CPC ............. *G05D 1/12* (2013.01); *B64C 39/024* (2013.01); *G05D 1/0016* (2013.01); *G05D 1/0033* (2013.01); *G05D 1/0094* (2013.01); *G05D 1/0202* (2013.01); *G05D 1/042* (2013.01); *G05D 1/101* (2013.01); *G08G 5/0069* (2013.01);

(Continued)

(58) Field of Classification Search
CPC ...... G05D 1/12; G05D 1/0094; G05D 1/0016; G05D 1/0033; G05D 1/0202; G05D 1/042; G05D 1/101; G05D 1/0223; G05D 1/0607; G08G 5/045; G08G 5/0069; G08G 5/0086; B64C 39/024; B64C 2201/14; B64C 2201/146; B64D 47/08
See application file for complete search history.

(56) References Cited

U.S. PATENT DOCUMENTS

| | | | |
|---|---|---|---|
| 4,773,017 A | 9/1988 | Murgue et al. | |
| 2009/0187299 A1 | 7/2009 | Fregene et al. | |

(Continued)

FOREIGN PATENT DOCUMENTS

| | | |
|---|---|---|
| CN | 101968353 A | 2/2011 |
| CN | 103935508 A | 7/2014 |

(Continued)

OTHER PUBLICATIONS

World Intellectual Property Organization (WIPO) International Search Report and Written Opinion for PCT/CN2016/104347 dated Jul. 26, 2017 8 Pages.

*Primary Examiner* — Jess Whittington
*Assistant Examiner* — Brian E Yang
(74) *Attorney, Agent, or Firm* — Anova Law Group, PLLC

(57) ABSTRACT

A method of controlling a movable object to track a target includes determining a difference between a desired height and a measured height of the movable object, determining a reference speed of the movable object or the target, and adjusting the movable object based on the reference speed and the difference between the desired height and the measured height.

15 Claims, 9 Drawing Sheets

(51) Int. Cl.
    *G05D 1/10*          (2006.01)
    *G08G 5/04*          (2006.01)
    *G08G 5/00*          (2006.01)

(52) U.S. Cl.
    CPC ........... *G08G 5/0086* (2013.01); *G08G 5/045* (2013.01); *B64C 2201/14* (2013.01)

(56) References Cited

U.S. PATENT DOCUMENTS

| | | | |
|---|---|---|---|
| 2013/0060406 A1* | 3/2013 | Christensen | G05D 1/0607 |
| | | | 701/4 |
| 2014/0129056 A1 | 5/2014 | Criado | |
| 2016/0070264 A1* | 3/2016 | Hu | G05D 1/042 |
| | | | 701/2 |
| 2016/0304198 A1 | 10/2016 | Jourdan | |

FOREIGN PATENT DOCUMENTS

| | | |
|---|---|---|
| CN | 104238580 A | 12/2014 |
| CN | 104571127 A | 4/2015 |
| CN | 104656664 A | 5/2015 |
| CN | 105045281 A | 11/2015 |
| CN | 105068547 A | 11/2015 |
| CN | 105138003 A | 12/2015 |
| CN | 105353762 A | 2/2016 |
| KR | 20130084780 A | 7/2013 |
| WO | 2016131127 A1 | 8/2016 |

\* cited by examiner

SYSTEMS AND METHODS FOR HEIGHT CONTROL OF A MOVABLE OBJECT

CROSS-REFERENCE TO RELATED APPLICATION

This application is a continuation of International Application No. PCT/CN2016/104347, filed Nov. 2, 2016, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to moveable object control and, more particularly, to systems and method for controlling the height of a moveable object.

BACKGROUND

Unmanned aerial vehicles (UAVs), sometimes referred to as "drones," may be configured to carry a payload, such as cargo, optical equipment (e.g., photo cameras, video cameras, etc.), sensory equipment, or other types of payload. UAVs may sometimes be controlled in conjunction with information gathered using optical or sensory equipment to identify and follow or "track" targets, such as people, vehicles, moving objects, etc. When UAVs are used to perform target tracking, it is often desired to maintain the UAV at a certain distance away from the target and/or the ground. For instance, it may be desired for the UAV to track the target at a certain distance behind (or in front of) the target and/or at a certain distance above the ground.

When a target is being tracked, the target may traverse uneven terrain or sloped terrain (e.g., hills, steps, ramps, etc.). The target may also encounter obstructions, such as walls, buildings, vehicles, and/or other objects that reach a certain height above the ground. When the target encounters sloped terrain or obstructions, the target may avoid it (i.e., stay on level ground) or traverse it, thereby changing its elevation. Current target tracking systems are not capable of simultaneously tracking targets while maintaining stable flight when targets traverse uneven or sloped terrain or obstructions. That is, current target tracking systems that may be capable of maintaining a desired horizontal distance from the target are not also configured to maintain stable flight with desired flight parameters in the vertical direction when slopes, obstructions, and the like are encountered during target tracking.

Accordingly, there is a need for improved systems and methods for measuring and controlling the height of a moveable objects moving over varying terrain.

SUMMARY

In one aspect, the present disclosure relates to a method of controlling a movable object to track a target. The method may include determining a difference between a desired height and a measured height of the movable object and determining a reference speed of the movable object or the target. The method may further include adjusting the movable object based on the difference between the desired height and the measured height and the reference speed.

In another aspect, the present disclosure relates to a system for controlling a movable object to track a target. The system may include a memory having instructions stored therein and a controller having a processor. The processor may be configured to execute the instructions to determine a difference between a desired height and a measured height of the movable object, determine a reference speed of the movable object or the target, and adjust the moveable object based on the difference between the desired height and the measured height and the reference speed.

In yet another aspect, the present disclosure relates to an unmanned aerial vehicle (UAV). The UAV may include a propulsion device, a memory storing instructions, and a controller in communication with the propulsion device and configured to control the UAV to track a target object. The controller may comprise a processor configured to execute the instructions to determine a difference between a desired height and a measured height of the UAV, determine a horizontal speed of the UAV or the target, and adjust the UAV based on the difference between the desired height and the measured height and the horizontal speed.

In yet another aspect, the present disclosure relates to a non-transitory computer-readable medium storing instructions, that, when executed, cause a computer to perform a method of controlling a movable object to track a target. The method may include determining a difference between a desired height and a measured height of the movable object, determining a reference speed of the movable object or the target, and adjusting the movable object based on the difference between the desired height and the measured height and the reference speed.

DETAILED DESCRIPTION

Figure 1:
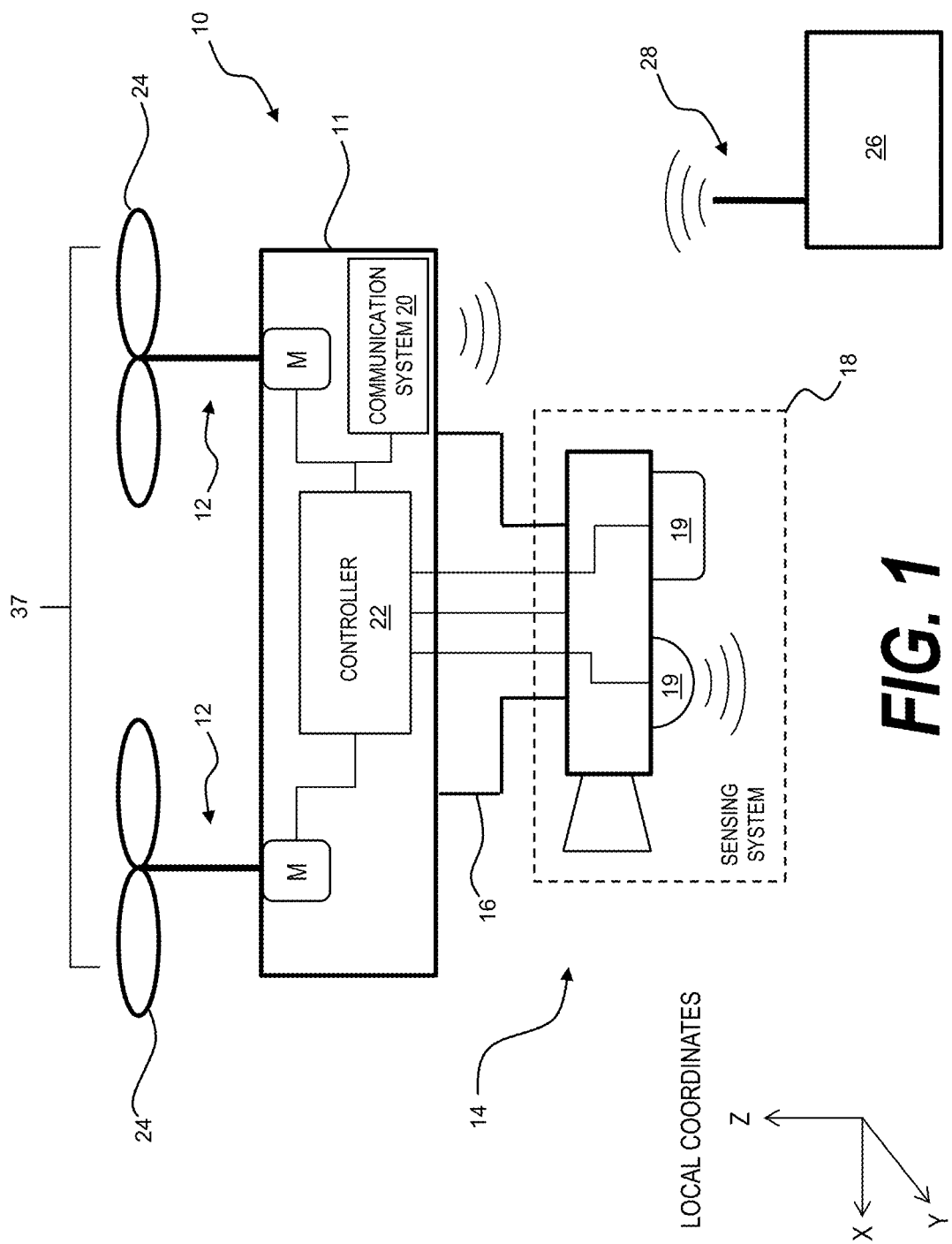
FIG. 1 is a schematic illustration of an exemplary movable object having a control system consistent with embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Unmanned aerial vehicles (UAV) are recognized in many industries and in many situations as useful tools for relieving personnel of the responsibility for directly performing certain tasks. For instance, UAVs have been used to deliver cargo, conduct surveillance, and collect various types of imaging and sensory data (e.g., photo, video, ultrasonic, infrared, etc.) in professional and recreational settings, providing great flexibility and enhancement of human capabilities.

Although they may be "unmanned," that is, operated without onboard personnel, UAVs are often fully or partially operated by off-board personnel who may be responsible for controlling multiple aspects of flight and/or other associated tasks (e.g., controlling cargo, operating imaging equipment, etc.). In many situations, associated tasks, such as operating imaging equipment mounted on the UAV, must be performed simultaneously with flight control, which can be challenging.

For example, in professional photography, filmography, and videography, UAVs may be equipped with imaging devices and used to capture footage from stationary and/or moving perspectives that may be otherwise too challenging for personnel to capture. In these situations, UAV flight parameters must be controlled concurrently with operation of the imaging equipment, which may require a high level of skill from the operator. To simplify flight control and allow the operator to concentrate more on operating the imaging equipment, some UAVs are configured to perform target tracking, which enables the UAV to automatically follow a moving target (e.g., a person, a vehicle, or another moving object).

Target tracking can be helpful to UAV operators because it can enable the UAV to automatically maintain stable flight while following a target at a specified distance from the target. For instance, the operator may desire the UAV to follow the target at a certain horizontal distance from the target (e.g., behind or in front) or at a certain vertical distance from the ground (i.e., at a certain height). However, controlling the height of the UAV during target tracking can be difficult when the target traverses uneven or sloped terrain (e.g., hills, steps, ramps, etc.) or when obstructions, such as walls, buildings, vehicles, and/or other objects that reach a certain height above the ground, are encountered during flight. Such features and objects can be detected by target tracking systems, thereby distorting determinations of UAV height. Such distortions can cause the tracking system to react by abruptly changing the UAV height, which can create inconsistent film and video footage or require the user to constantly make adjustments to the optical equipment to counteract the height changes. Thus, improved systems and methods for determining and controlling UAV height during target tracking are desired.

FIG. 1 shows an exemplary movable object 10 that may be configured to move or travel within an environment. Movable object 10 may be any suitable object, device, mechanism, system, or machine configured to travel on or within a suitable medium (e.g., a surface, air, water, rails, space, underground, etc.). For example, movable object 10 may be an unmanned aerial vehicle (UAV). Although movable object 10 is shown and described herein as a UAV for exemplary purposes of this description, it is understood that other types of movable objects (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may have a housing 11, may include one or more propulsion assemblies 12, and may be configured to carry a payload 14. In some embodiments, as shown in FIG. 1, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include a sensing system 18, a communication system 20, and a controller 22 in communication with the other components.

Movable object 10 may include one or more (e.g., 1, 2, 3, 4, 5, 10, 15, 20, etc.) propulsion devices, such as one or more propulsion assemblies 12 positioned at various locations (for example, top, sides, front, rear, and/or bottom of movable object 10) for propelling and steering movable object 10. Propulsion assemblies 12 may be devices or systems operable to generate forces for sustaining controlled flight. Propulsion assemblies 12 may share or may each separately include or be operatively connected to a power source, such as a motor M (e.g., an electric motor, hydraulic motor, pneumatic motor, etc.), an engine (e.g., an internal combustion engine, a turbine engine, etc.), a battery bank, etc., or combinations thereof. Each propulsion assembly 12 may also include one or more rotary components 24 drivably connected to the power source and configured to participate in the generation of forces for sustaining controlled flight. For instance, rotary components 24 may include rotors, propellers, blades, nozzles, etc., which may be driven on or by a shaft, axle, wheel, hydraulic system, pneumatic system, or other component or system configured to transfer power from the power source. Propulsion assemblies 12 and/or rotary components 24 may be adjustable (e.g., tiltable) with respect to each other and/or with respect to movable object 10. Alternatively, propulsion assemblies 12 and rotary components 24 may have a fixed orientation with respect to each other and/or movable object 10. In some embodiments, each propulsion assembly 12 may be of the same type. In other embodiments, propulsion assemblies 12 may be of multiple different types. In some embodiments, all propulsion assemblies 12 may be controlled in concert (e.g., all at the same speed and/or angle). In other embodiments, one or more propulsion devices may be independently controlled with respect to, e.g., speed and/or angle.

Propulsion assemblies 12 may be configured to propel movable object 10 in one or more vertical and horizontal directions and to allow movable object 10 to rotate about one or more axes. That is, propulsion assemblies 12 may be configured to provide lift and/or thrust for creating and maintaining translational and rotational movements of movable object 10. For instance, propulsion assemblies 12 may be configured to enable movable object 10 to achieve and maintain desired altitudes, provide thrust for movement in all directions, and provide for steering of movable object 10. In some embodiments, propulsion assemblies 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion assemblies 12 may be configured to enable movement of movable object 10 along and/or about multiple axes, as described below in connection with FIG. 4.

Payload 14 may include one or more sensory devices 19 Sensory devices 19 may include devices for collecting or generating data or information, such as surveying, tracking, and capturing images or video of targets (e.g., objects, landscapes, subjects of photo or video shoots, etc.). Sensory devices 19 may include imaging devices configured to gathering data that may be used to generate images. For example, imaging devices may include photographic cameras, video cameras, infrared imaging devices, ultraviolet imaging devices, x-ray devices, ultrasonic imaging devices, radar devices, etc. Sensory devices 19 may also or alternatively include devices for capturing audio data, such as microphones or ultrasound detectors. Sensory devices 19 may also or alternatively include other suitable sensors for capturing visual, audio, and/or electromagnetic signals.

Sensory devices 19 may also or alternatively include devices for measuring, calculating, or otherwise determining the position or location of movable object 10. For instance, sensory devices 19 may be devices for determining the height (i.e., distance above the ground) of movable object 10 and/or the altitude (i.e., with respect to sea level) of movable object 10. Sensory devices 19 may include optical sensors (e.g., cameras, binocular cameras, etc.), ultrasonic sensors, barometers, radar systems (e.g., millimeter wave radar), laser systems, etc. In some embodiments, movable object 10 may be equipped with multiple sensory devices 19, each operable to generate a different measurement signal. Sensory devices 19 may also or alternatively be or include devices for determining the movements, orientation, and/or location of movable object 10, such as a positioning sensor for a positioning system (e.g., GPS, GLONASS, Galileo, Beidou, GAGAN, etc.), motion sensors, inertial sensors (e.g., IMU sensors), proximity sensors, image sensors, etc. Sensory devices 19 may also include sensors or be configured to provide data or information relating to the surrounding environment, such as weather information (e.g., temperature, pressure, humidity, etc.), lighting conditions, air constituents, or nearby obstacles (e.g., objects, structures, people, other vehicles, etc.)

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤90°, ≤45°, ≤30°, ≤15° etc.), about one or more of its axes.

Communication system 20 may be configured to enable communications of data, information, commands, and/or other types of signals between controller 22 and off-board entities. Communication system 20 may include one or more components configured to send and/or receive signals, such as receivers, transmitter, or transceivers that are configured to carry out one- or two-way communication. Components of communication system 20 may be configured to communicate with off-board entities via one or more communication networks, such as radio, cellular, Bluetooth, Wi-Fi, RFID, and/or other types of communication networks usable to transmit signals indicative of data, information, commands, and/or other signals. For example, communication system 20 may be configured to enable communications with user input devices for providing input for controlling movable object 10 during flight, such as a control terminal ("terminal") 26.

Terminal 26 may be configured to receive input, such as input from a user (i.e., user input), and communicate signals indicative of the input to controller 22. Terminal 26 may be configured to receive input and generate corresponding signals indicative of one or more types of information, such as control data (e.g., signals) for moving or manipulating movable device 10 (e.g., via propulsion assemblies 12), payload 14, and/or carrier 16. Terminal 26 may also be configured to receive data and information from movable object 10, such as operational data relating to, for example, positional data, velocity data, acceleration data, sensory data, and other data and information relating to movable object 10, its components, and/or its surrounding environment. Terminal 26 may be a remote control with physical sticks configured to control flight parameters, or a touch screen device, such as a smartphone or a tablet, with virtual controls for the same purposes, or an application on a smartphone or a table, or a combination thereof.

Figure 2B:
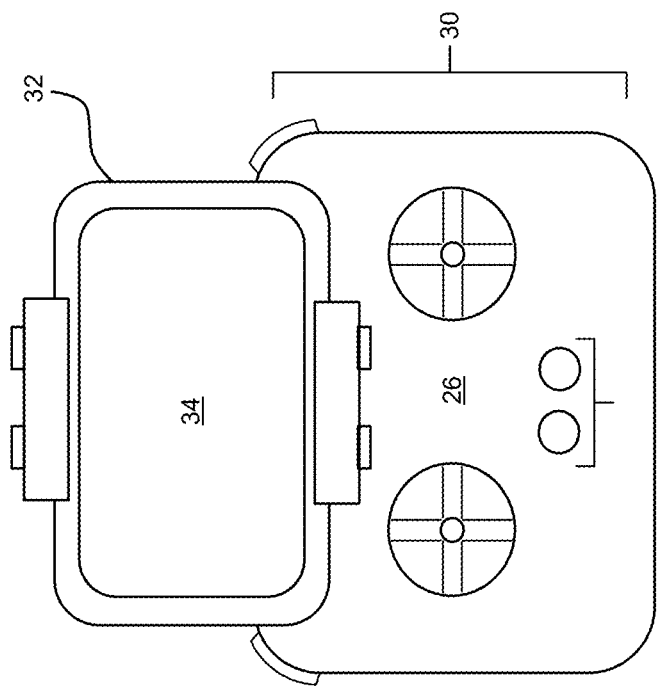
FIGS. 2A and 2B show exemplary terminals consistent with embodiments of the present disclosure.
Figure 2A:
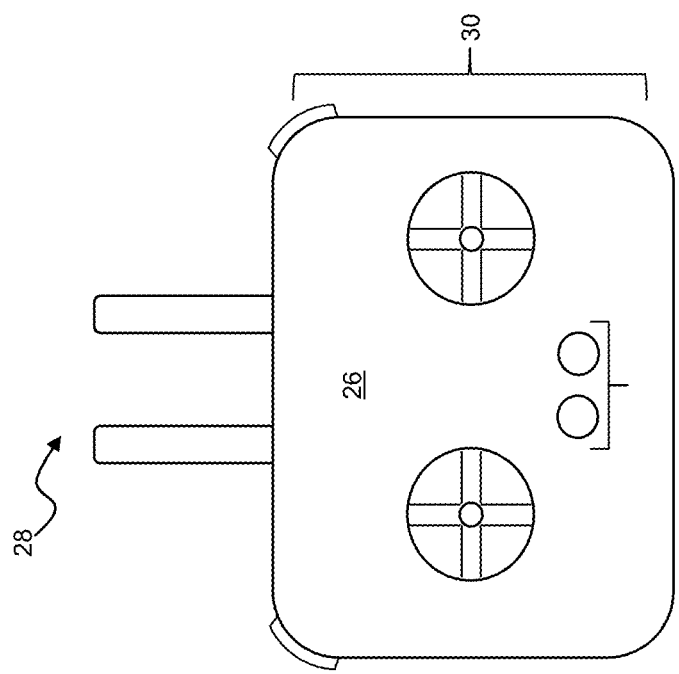

Referring now to FIGS. 2A and 2B, terminal 26 may include communication devices 28 that facilitate communication of information between terminal 26 and other entities, such as movable object 10. Communication devices 28 may include antennae or other devices configured to send or receive signals. Terminal 26 may also include one or more input devices 30 configured to receive input from a user for communication to movable object 10. FIG. 2A shows one exemplary embodiment of terminal 26 having a plurality of input devices 30 configured to receive user inputs indicative of desired movements of movable object 10 (manual flight control settings, automated flight control settings, flight control assistance settings etc.) or desired control of carrier 16, payload 14, or other components. It is understood, however, that other possible embodiments or layouts of terminal may be possible and are within the scope of this disclosure.

As shown in FIG. 2B, terminal 26 may also include a display device 32 configured to display and/or receive information to and/or from a user (e.g., relating to movements of movable object 10 and/or imaging data captured with payload 14). In some embodiments, display device 32 may be a multifunctional display device configured to display information on a multifunctional screen 34 as well as receive user input via the multifunctional screen 34. For example, in one embodiment, display device 32 may be configured to receive one or more user inputs via multifunctional screen 34. In another embodiment, multifunctional screen 34 may constitute a sole input device for receiving user input. In some embodiments, display device 32 may be the display device of a separate electronic device, such as a cellular phone, a tablet, a computer, etc., in communication with terminal 26 and/or movable object 10. For example, terminal 26 (or movable object 10) may be configured to communicate with electronic devices having a memory and at least one processor, which electronic devices may then be used to provide user input via input devices associated with the electronic device (e.g., a multifunctional display, buttons, stored apps, web-based applications, etc.). Communication between terminal 26 (or movable object 10) and electronic devices may also be configured to allow for software update packages and/or other information to be received and then communicated to controller 22 (e.g., via communication system 20).

In some embodiments, terminal 26 may be or include an interactive graphical interface for receiving one or more user inputs. That is, terminal 26 may be a graphical user interface (GUI) and/or include one or more graphical versions of input devices 30 for receiving user input. Graphical versions of terminal 26 and/or input devices 30 may be displayable on a display device (e.g., display device 32) or a multifunctional screen (e.g., multifunctional screen 34) and include graphical features, such as interactive graphical features (e.g., graphical buttons, text boxes, dropdown menus, interactive images, etc.). In some embodiments, terminal 26 may be or include a computer application (e.g., an "app") to provide an interactive interface on the display device or multifunctional screen of any suitable electronic device (e.g., a cellular phone, a tablet, etc.) for receiving user inputs.

Figure 3:
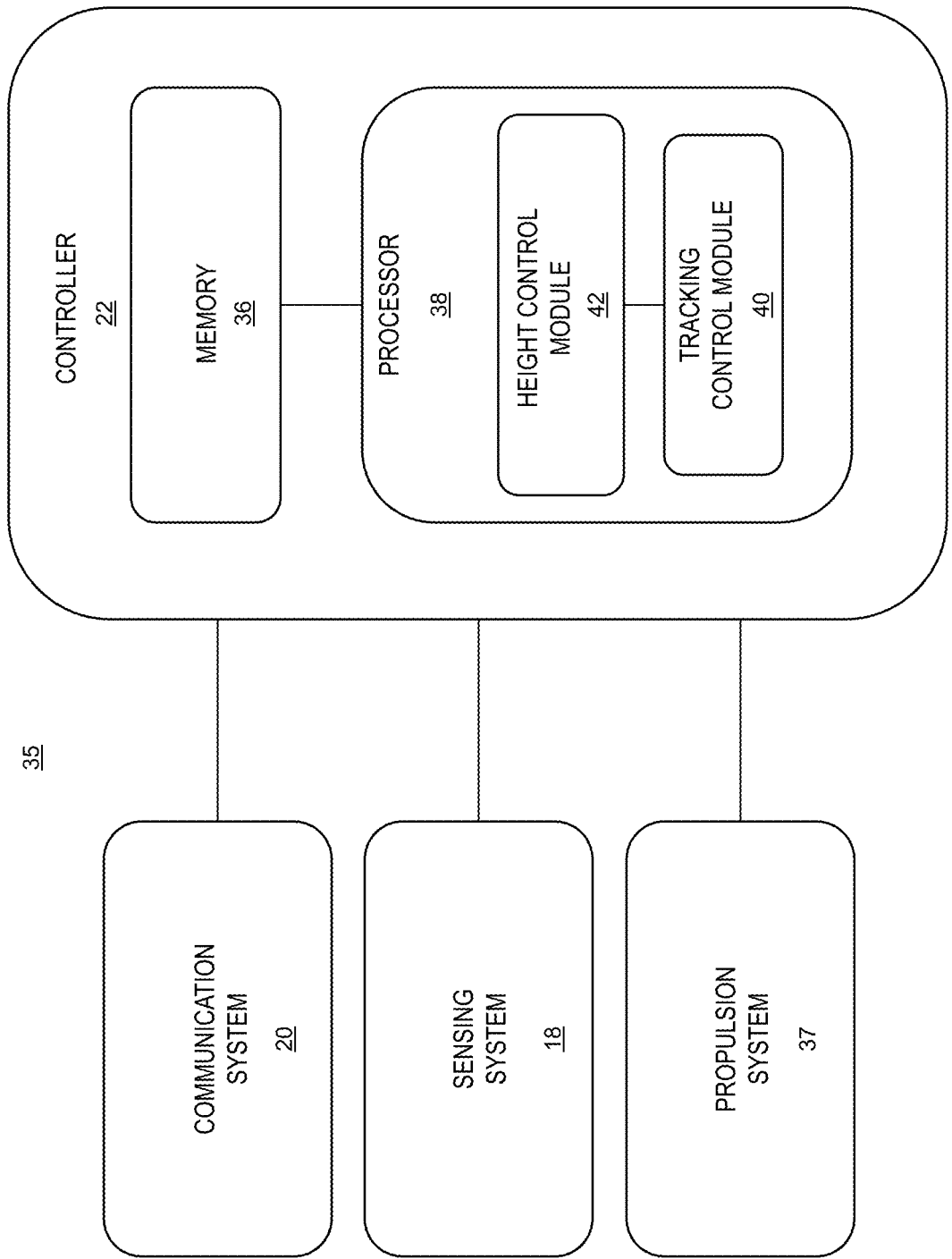
FIG. 3 shows an exemplary control system consistent with embodiments of the present disclosure.

FIG. 3 shows an exemplary control system 35 consistent with embodiments of this disclosure and configured to control target tracking and/or height control of movable object 10. Control system 35 may include sensing system 18, communication system 20, and a propulsion system 37 (e.g., propulsion assemblies 12 and related components) in communication with controller 22. Controller 22 may include one or more components, for example, a memory 36 and at least one processor 38. Memory 36 may be or include non-transitory computer-readable media and can include one or more memory units of non-transitory computer-readable media. Non-transitory computer-readable media of memory 36 may be or include any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable media (e.g., removable media or external storage, such as an SD card, RAM, etc.).

Information and data from sensing system 18 may be communicated to and stored in non-transitory computer-readable media of memory 36. Non-transitory computer-readable media associated with memory 36 may also be configured to store logic, code and/or program instructions executable by processor 38 to perform any suitable embodiment of the methods described herein. For example, non-transitory computer-readable media associated with memory 36 may be configured to store computer-readable instructions that, when executed by processor 38, cause the processor to perform a method comprising one or more steps. The method performed by the processor based on the instructions stored in the non-transitory computer readable media may involve processing inputs, such as inputs of data or information stored in the non-transitory computer-readable media of memory 36, inputs received from terminal 26, inputs received from sensing system 18 (e.g., received directly from sensing system or retrieved from memory), and/or other inputs received via communication system 20. The non-transitory computer-readable media may be configured to store sensing data from sensing system 18 to be processed by processor 38. In some embodiments, the non-transitory computer-readable media can be used to store the processing results produced by processor 38.

Processor 38 may include one or more processors and may embody a programmable processor (e.g., a central processing unit (CPU). Processor 38 may be operatively coupled to memory 36 or another memory device configured to store programs or instructions executable by processor 38 for performing one or more method steps. It is noted that method steps described herein may be stored in memory 36 and configured to be carried out by processor 38 to cause the method steps to be carried out by the processor 38.

In some embodiments, processor 38 may include and/or alternatively be operatively coupled to one or more control modules, such as a tracking control module 40 and a height control module 42, which will be explained in greater detail below. Tracking control module 40 may be configured to help control propulsion assemblies 12 of movable object 10 to adjust the spatial disposition, velocity, and/or acceleration of the movable object 10 with respect to six degrees of freedom (e.g., three translational directions along its coordinate axes and three rotational directions about its coordinate axes) to enable movable object 10 to track a target. Height control module 42 may be configured to help control propulsion assemblies 12 of movable object 10 to adjust the position, velocity, and/or acceleration of the movable object 10 in the vertical direction when target tracking is being executed. Tracking control module 40 and height control module 42 may be implemented in software for execution on processor 38, or may be implemented in hardware or software components separate from processor 38 (not shown in the figure).

Processor 38 can be operatively coupled to the communication system 20 and be configured to transmit and/or receive data from one or more external devices (e.g., terminal 26, display device 32, or other remote controller). Any suitable means of communication can be used to transfer data and information to or from controller 22, such as wired communication or wireless communication. For example, communication system 20 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication system 20 can transmit and/or receive one or more of sensing data from the sensing system 18, processing results produced by the processor 38, predetermined control data, user commands from terminal 26 or a remote controller, and the like.

The components of controller 22 can be arranged in any suitable configuration. For example, one or more of the components of the controller 22 can be located on the movable object 10, carrier 16, payload 14, terminal 26, sensing system 18, or an additional external device in communication with one or more of the above. In some embodiments, one or more processors or memory devices can be situated at different locations, such as on the movable object 10, carrier 16, payload 14, terminal 26, sensing system 18, additional external device in communication with one or more of the above, or suitable combinations thereof, such that any suitable aspect of the processing and/or memory functions performed by the system can occur at one or more of the aforementioned locations.

Figure 4:
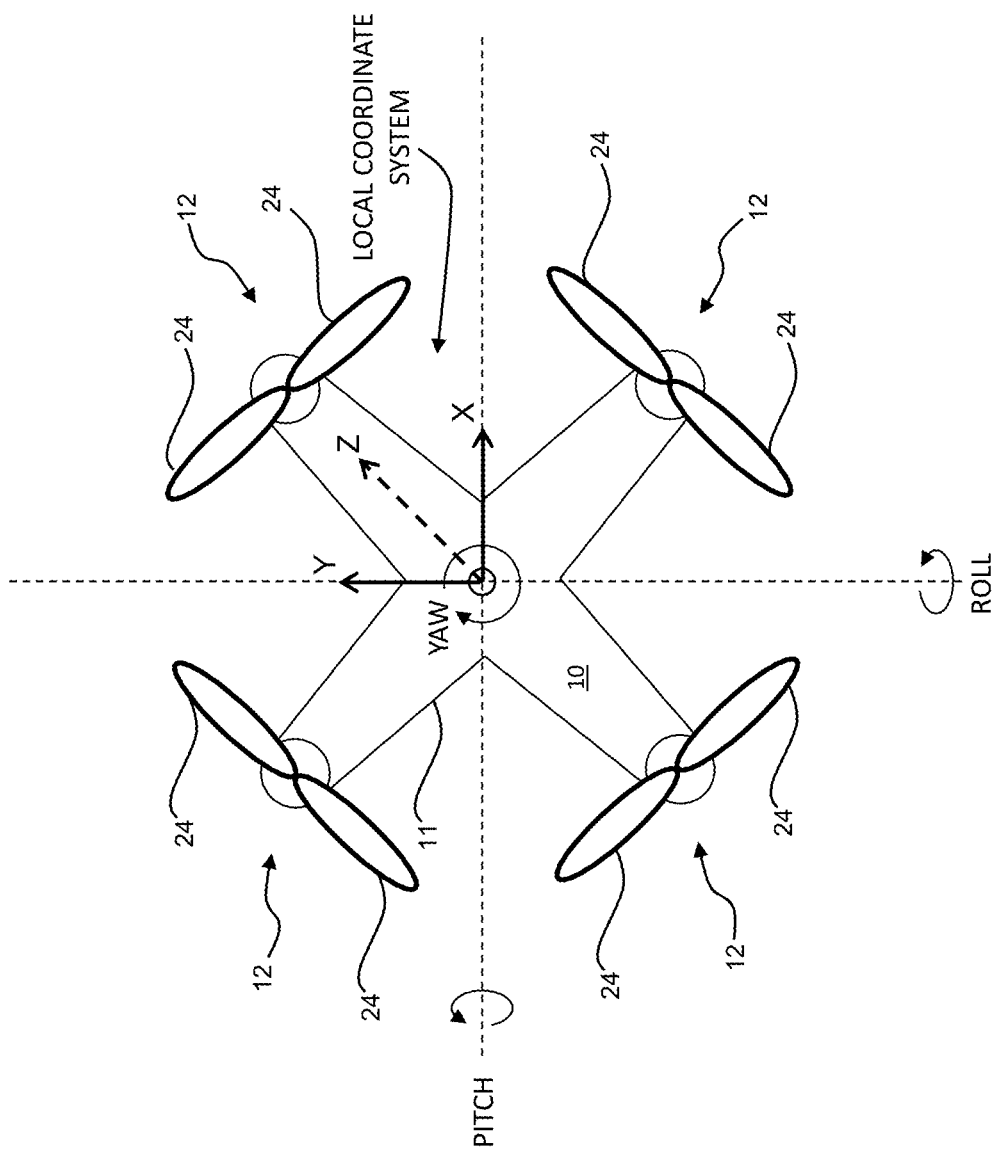
FIG. 4 shows an exemplary coordinate system and axis convention that is consistent with embodiments of the present disclosure.

The flight behavior of movable object 10 may be understood and controlled in a defined coordinate system. For example, FIG. 4 illustrates a local coordinate system defined with respect to the movable object 10 for describing movements from the perspective of movable object 10. The local coordinate system may include three axes, such as an X-axis (e.g., a first horizontal axis), a Y-axis (e.g., a second horizontal axis), and a Z-axis (e.g., a vertical axis). Movements of movable object 10 may include roll, pitch, yaw, horizontal translations (e.g., left, right, forward, backward, etc.), vertical translation (e.g., height or altitude), horizontal speeds, vertical speed, rotational speeds (e.g., angular, radial, tangential, axial, etc.), and accelerations (e.g., horizontal, vertical, rotational, etc.). Each axis of the local coordinate system may be associated with one or more particular position or movement parameters that may be changed or adjusted during flight to facilitate effective control of movable object 10 to enable target tracking and height control of movable object 10.

For instance, in the exemplary local coordinate system of FIG. 4, each of the X-axis, Y-axis, and Z-axis may be associated with translational movements and linear displacements along or in the direction of the respective axis, as well as rotational movements and angular displacements about the respective axis. In the example of FIG. 4, the X-axis may also be referred to as a pitch axis, about which movable object 10 may undergo pitch rotational movements (e.g., movements tending to tilt one of a front or rear of movable object 10 upward while tilting the other downward) and along which movable object 10 may undergo side-to-side (e.g., left or right) translational movements. The Y-axis may be referred to as a roll axis, about which the movable object 10 may undergo roll rotational movements (i.e., movements tending to tilt one of a left or right side of movable object 10 upward while tilting the other side downward) and along which movable object 10 may undergo forward and backward translational movements. The Z-axis may be referred to as a yaw axis, about which the movable object 10 may undergo yaw rotational movements (i.e., rotational movements on or parallel with a plane defined by the X- and Y-axes) and along which movable object 10 may undergo up and down (i.e., vertical, altitudinal, or height) translational movements. A person of ordinary skill in the art would appreciate that more or fewer axes, or different axis conventions may be used. It is also noted that directional and planar descriptions (e.g., side-to-side, back and forth, up and down, horizontal, vertical, etc.) are used merely for purposes of example and clarification and are not limiting.

Figure 5A:
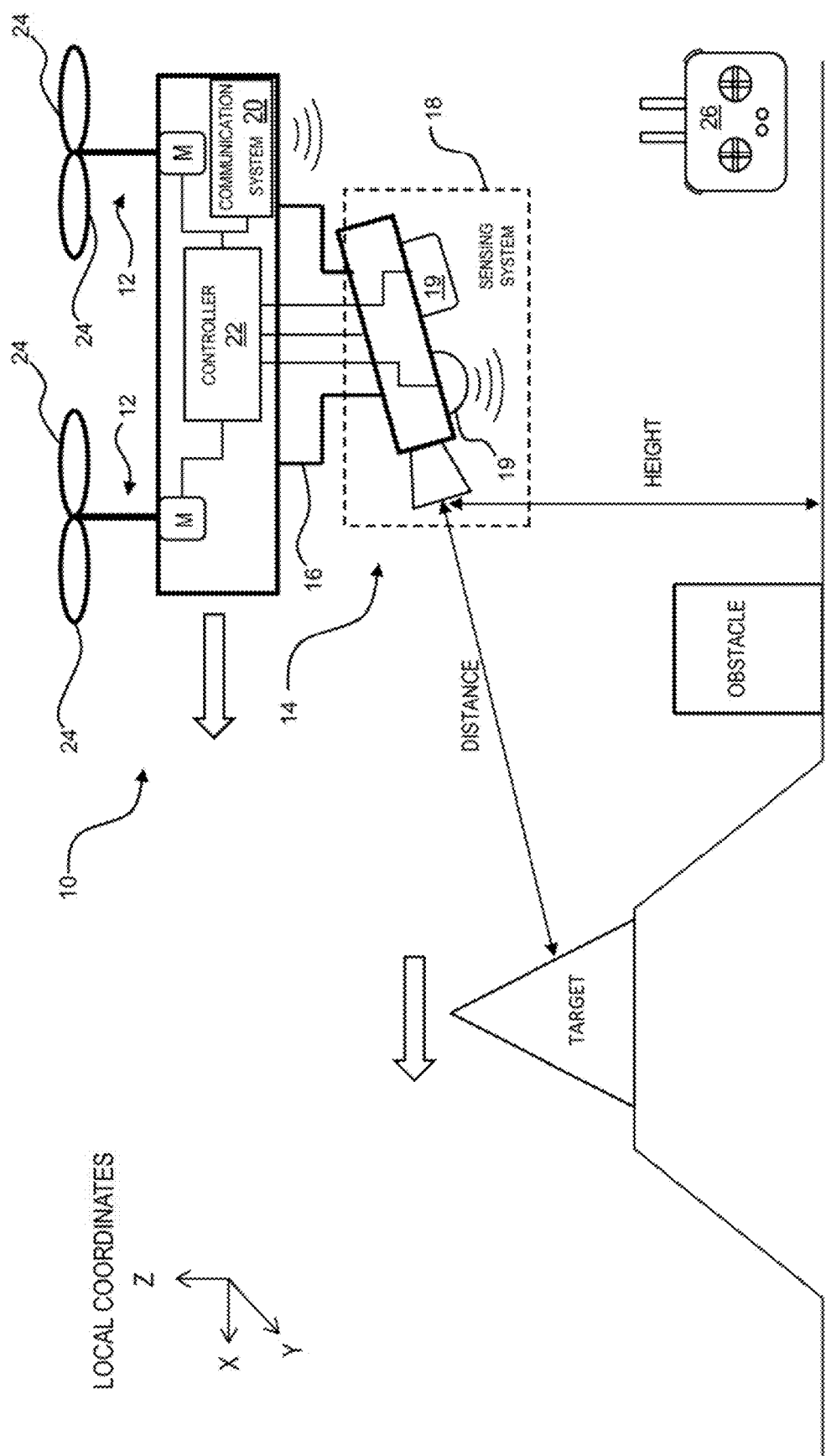
FIG. 5A shows an exemplary tracking system consistent with embodiments of the present disclosure.

As mentioned above, experience and skill are required for a user to control and maintain stable flight of movable object 10 along and/or about each axis (e.g., via terminal 26), particularly so during complicated flight maneuvers and/or when the user has to simultaneously control the operations of attached equipment such as a camera. For example, with reference to FIG. 5A, when the user is controlling movable object 10 to follow and maintain alignment with a target moving along the X-axis (or Y-axis) of its local coordinate system, the user often has to make a great effort to maintain the desired tracking parameters (e.g., distance from the target, speed, acceleration, height, etc.) while also effectively operating the attached equipment (e.g., the camera). This task can be even more challenging when the terrain over which the target travels is uneven, has inclines or elevation changes, or has obstacles over which the target and/or movable object 10 may traverse. To assist the operator in following the target while maintaining stable flight, movable object 10 may be configured to automatically track the target (i.e., perform target tracking). That is, controller 22, in conjunction with sensing system 18 and/or communicating system 20, may be configured to generate and/or receive data and/or other inputs, identify the target, and control the propulsion system (e.g., propulsion assemblies 12) to follow the target according to desired tracking and flight parameters.

Figure 5B:
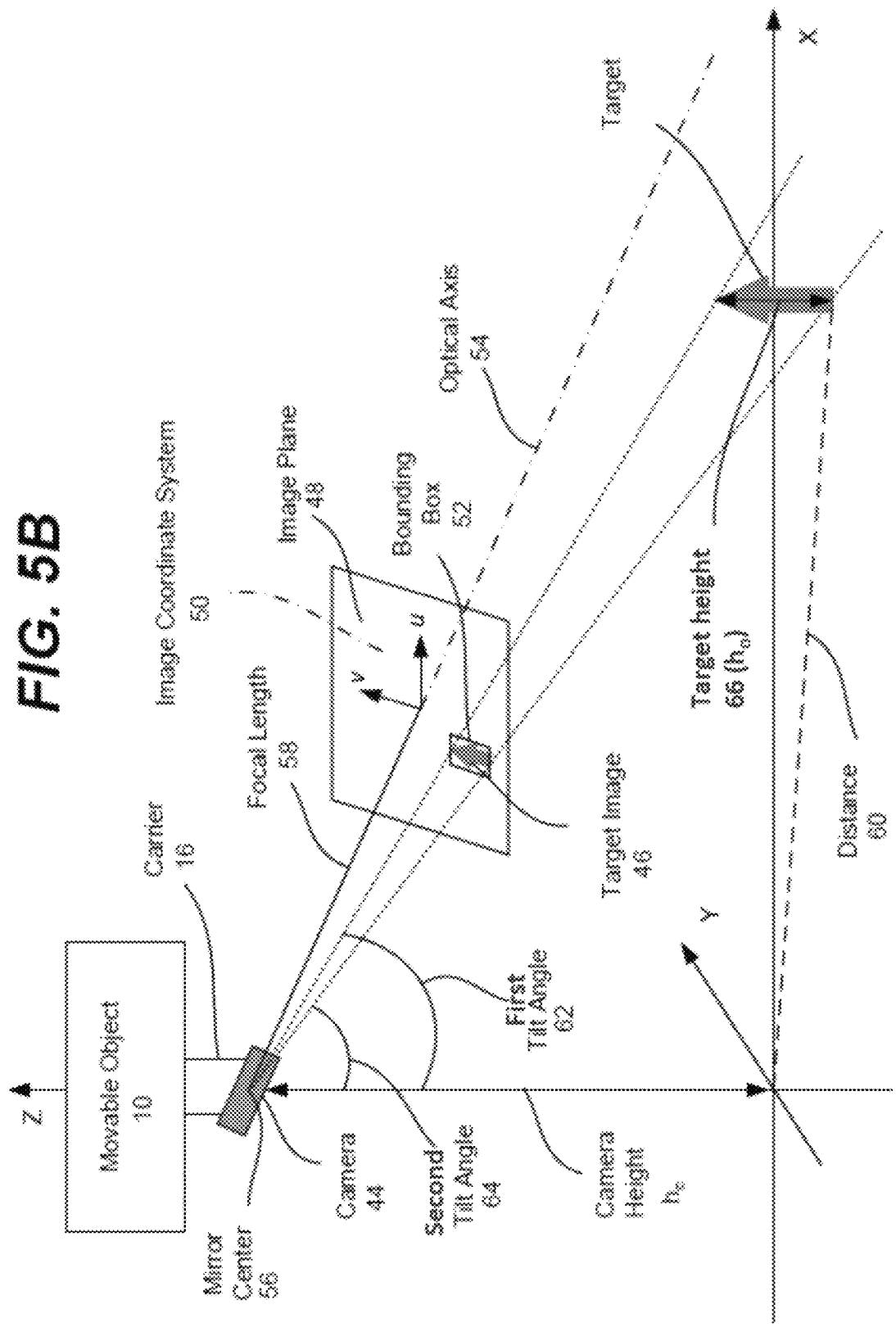
FIG. 5B shows a system for target tracking consistent with embodiments of the present disclosure.

With reference to FIG. 5B, target tracking may be performed in conjunction with a sensory device (i.e., sensory device 19, FIG. 1), such as a camera 44, connected to movable object 10. Camera 44 may be configured to capture a target image 46 on an image plane 48 in an image coordinate 50 system. A bounding box 52 may be generated around target image 46 in image plane 48.

Target image 46 may be represented based on an aperture imaging model, which assumes that a light ray from an object point in a three dimensional space can be projected onto an image plane to form an image point. Camera 44 may include an optical axis 54, a mirror having a center 56, and a focal length 58. When optical axis 54 passes through both mirror center 56 and the center of image plane 48, the distance between mirror center 56 and the center of image plane 48 can be equal or substantial similar to focal length 58.

The projected relative distance 60 on the ground between mirror center 56 and the target (i.e., the distance along the X-axis from camera 44 and the target) can then be determined based on geometric relationships and coordinate transformations. For example, the target may have a top target point $(x_t, y_t, z_t)$ and a bottom target point $(x_b, y_b, z_b)$ in a world coordinate system, which may be projected on image plane 48 as a top image point $(u_t, v_t)$ and a bottom image point $(u_b, v_b)$ respectively. A top line passes through mirror center 56 and the top image point at a first tilt angle 62 with respect to the axis Z of the world coordinates. Also, a bottom line passes through mirror center 56 and the bottom image point at a second tilt angle 64 from the axis Z.

Direction vectors $\vec{T}$ and $\vec{B}$ from camera 44 to the top and bottom of the target can be expressed as in the following.

$$\vec{T} = \begin{pmatrix} x_t \\ y_t \\ z_t \end{pmatrix} \sim RK^{-1} \begin{pmatrix} u_t \\ v_t \\ 1 \end{pmatrix}$$

$$\vec{B} = \begin{pmatrix} x_b \\ y_b \\ z_b \end{pmatrix} \sim RK^{-1} \begin{pmatrix} u_b \\ v_b \\ 1 \end{pmatrix}$$

where K represents the intrinsic matrix of the camera, and R represents the camera rotation.

The distance 60 to the target can then be determined based on the height of the camera $h_c$ and position of the bounding box 52 in the image coordinate system 50. For example, the distance 60 to the target can be calculated as $d=-h_c/z_b *P_b$, and the target height 66 can be calculated as $h_o=+z_t d/P_t$, where $h_c$ is the measured or effective height of the camera, $P_b$ is the projection length of $\vec{B}$ on the ground, and $P_t$ is the projection length of $\vec{T}$ on the ground, which are defined as in the following.

$$P_b = \sqrt{x_b^2 + y_b^2}$$

$$P_t = \sqrt{x_t^2 + y_t^2}$$

Thereafter, the system can estimate the horizontal distance 60 (i.e., along the X-axis) to the target, even when the target altitude changes (e.g. when the target traverses rough terrain, inclines, stairs, climbs objects, hovers or flies at varying altitudes, etc.). The projected relative distance 60 on the ground between the target 10 and the movable object 10 can be calculated as $h_c/dh$, where dh present the estimate height of the target at a unit distance away from the camera, which can be computed using the following formula.

$$dh = \left\| \frac{\vec{T}}{P_t} - \frac{\vec{B}}{P_b} \right\|$$

To provide target tracking, controller 22 may be configured to automatically control propulsion assemblies 12 in order to maintain the horizontal distance 60 at desired or default values during flight. For example, tracking control module 40 may be configured to continually or periodically calculate the horizontal distance 60 and use feedback control (e.g., PID control) to maintain the horizontal distance 60 at a desired value (e.g., input by the user via terminal 26) or a default value. Target tracking may be conducted even when the height of movable object 10 changes, such as when movable object traverses rough terrain, slopes, other objects, etc., while tracking a target.

As described above, tracking the target along a horizontal plane requires measuring or otherwise determining the height $h_c$ of camera 44. The height $h_c$ of camera 44 relates to the height $h_{UAV}$ of movable object 10 (or "actual height") because camera 44 (or another types of sensory device 19) is connected to movable object 10 directly or by carrier 16. As used herein, "height" may refer to a distance along a vertical axis from a reference surface, reference object, reference feature (e.g., a feature of terrain, a surface, an object, etc.), or other reference location. An "actual height" may refer to the height of an object, whereas a "measured height" may refer to a height measurement (e.g., a measurement of the actual height, of a relative height, or another height). Thus, as the actual height $h_{UAV}$ of movable object 10 changes during flight, the view or perspective of the target from the point of view of camera 44 can change. While this change in view or perspective may not hinder target tracking in the horizontal direction (as discussed above), it can require great skill from the operator to ensure that camera 44 maintains a view of the target and/or to ensure that high quality optical footage is collected. For instance, when sudden adjustments to the actual height $h_{UAV}$ of movable object 10 are made, such as to follow a moving target that suddenly traverses an incline or another object, or during a maneuver to fly above an obstacle (e.g., a wall or other object), the user may be required to quickly readjust camera 44 in order to maintain a view of the target. When such drastic changes in height occur frequently, it may be difficult for the operator to maintain a view of the target for purpose target tracking while also gathering stable optical footage.

Figure 6:
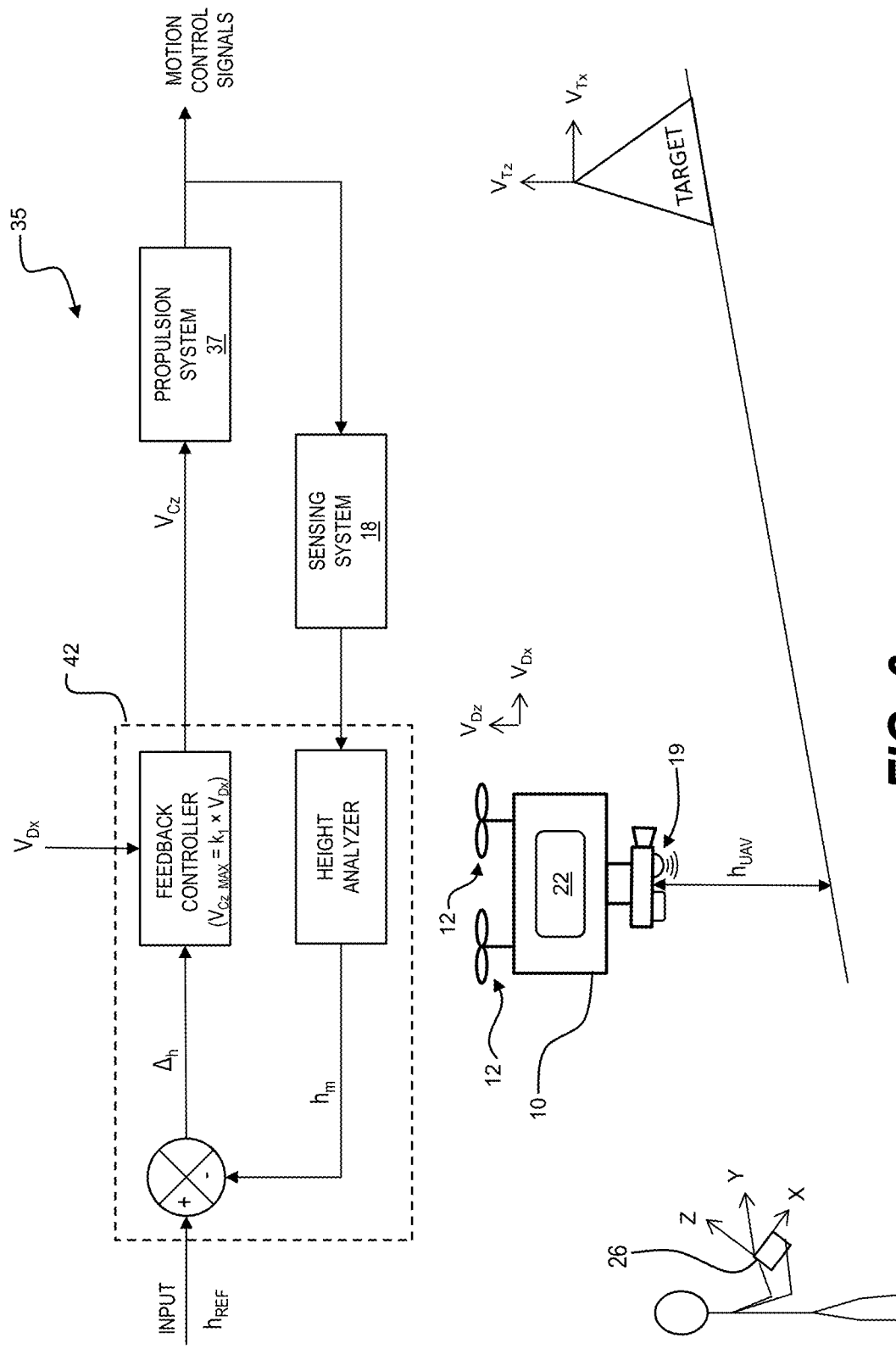
FIG. 6 shows an exemplary tracking system consistent with embodiments of the present disclosure.

To assist operators in controlling the actual height $h_{UAV}$ of movable object 10, control system 35 (referring to FIG. 3) may be configured to automatically control of the actual height $h_{UAV}$ of movable object 10 during target tracking in the horizontal direction. Referring now to FIG. 6, control system 35 may be configured to control propulsion system 37 based on height measurements generated by sensing system 18 and the horizontal speed of movable object 10 to enable feedback control of the actual height $h_{UAV}$ of movable object 10 during target tracking.

In some embodiments, control system 35 may receive height measurements $h_m$ from sensing system 18, which may be indicative of the actual height $h_{UAV}$ of movable object 10. Height measurement $h_m$ may be indicative of a measured height, such as the actual height $h_{UAV}$ of movable object 10. For example, one or more sensory devices 19 (e.g., camera 44, infrared imaging devices, ultraviolet imaging devices, x-ray devices, ultrasonic imaging devices, radar devices, etc.) may generate one or more height measurement signals that may be communicated to height control module 42 in controller 22. Height control module 42 may include a height analyzer (e.g., a height analysis module) or otherwise be configured to determine the actual height $h_{UAV}$ of movable object 10 with respect to the ground based on the height measurements $h_m$. For example, in some embodiments, height control module 42 may determine the height measurement $h_m$ of movable object 10 based on a single height measurement signal from sensing system 18 (e.g., from one sensory device). In other embodiments, height control module 42 may determine the height measurement $h_m$ of movable object 10 based on an analysis of multiple height measurement signals (e.g., from multiple or different types of sensors) and/or other data generated by sensing system 18.

Control system 35 may be configured to determine a difference between the height measurement $h_m$ of movable object 10 and a desired height $h_{REF}$ of movable object 10. The desired height $h_{REF}$ of movable object 10 may be a default height value or a user-selected height value. That is, the desired height $h_{REF}$ may be a control height (i.e., a height to which movable object 10 is to be moved or maintained). For example, the user may provide an input indicative of the desired height $h_{REF}$ using terminal 26, and terminal 26 may generate a signal indicative of the desired height $h_{REF}$ that may be received by control system 35 via communication system 20 The height measurement $h_m$ of movable object 10 and the desired height $h_{REF}$ of movable object 10 may be input into an adder or otherwise processed to generate a signal indicative of a difference $\Delta_h$ between the height measurement $h_m$ and the desired height $h_{REF}$ of movable object 10. The difference $\Delta_h$ between the height measurement $h_m$ and the desired height $h_{REF}$ of the movable object may represent a height error signal. This height error signal may be used by height control module 42 to perform feedback control of the actual height $h_{UAV}$ of the movable object to achieve and/or maintain the desired height $h_{REF}$.

Control system 35 may be further configured to receive a signal indicative of a reference speed. In some embodiments, as the reference speed may be a horizontal speed $V_{DX}$ of the movable object, for use in feedback control of the actual height $h_{UAV}$ of movable object 10. Other types of reference speeds, for example, speeds in other directions (e.g., along or about other axes of movable object 10 or axes in other coordinate or reference systems), may be used. In some embodiments, the horizontal speed $V_{DX}$ of movable object 10 may be determined using one or more sensors. For example, movable object 10 may be equipped with one or more differential pressure sensors configured to measure the airspeed of movable object 10. Alternatively, propulsion assemblies 12 may be equipped with speed sensors (e.g., magnetic sensors, optical sensors, encoders, etc.) configured to determine the rotational speed of each propulsion assembly. Based on the rotational speed of each propulsion assembly 12, controller 22 may be configured to determine the horizontal speed $V_{DX}$ of movable object 10. In some embodiments, the horizontal speed $V_{DX}$ may be determined empirically based on a mapping or other correlation of the horizontal speed $V_{DX}$ to reference speed signals (e.g., generated by the user via terminal 26). Other ways of determining the horizontal speed $V_{DX}$ of movable object 10 may be used.

In other embodiments, the reference speed may be a horizontal speed $V_{tx}$ of the target (i.e., the object of target tracking) perpendicular to a vertical speed $V_{tz}$ of the target (shown in FIG. 6). For example, in some situations, movable object 10 may be controlled to follow a target at a certain distance (or from a certain relative position) as the target moves or travels. During target tracking, the horizontal speed of movable object 10 may be equal to or within an acceptable margin of the horizontal speed of the target. Thus, a determined horizontal speed of the target may be used as the reference speed or to determine the reference speed. The horizontal speed of the target may be determined, for example, by a speed sensor associated with (e.g., onboard) the target and configured to generate a speed signal, such as an airspeed sensor, a position-based sensor (e.g., GPS-based speed sensor), an empirical speed sensor (e.g., an electronic controller or electronic control module configured to determine speed from other parameters, such as motor speed, engine speed, wheel speed, spatial orientation, etc.), or another type of speed sensors. The speed signal may be communicated to movable object 10 for further processing. Target speed may also or alternatively be determined using an off-board system, such as a radar, ultrasound, laser, or other type of speed detection system.

Control system 35 may be configured to automatically generate a control signal configured to change the actual height $h_{UAV}$ of the moveable object based on the horizontal speed $V_{DX}$ of the movable object and the difference $\Delta_h$ between the height measurement $h_m$ and the desired height $h_{REF}$ of movable object 10. For example, height control module 42 may include a feedback controller or otherwise be configured to generate a control signal using feedback control (e.g., PID control) to change the actual height $h_{UAV}$ of movable object 10 and reduce the difference $\Delta_h$ between the desired height $h_{REF}$ and the height measurement $h_m$ by adjusting one or more of the movement characteristics of movable object 10. For example, the control signal generated by height control module 42 may be configured to control operation of propulsion system 18 in order to achieve a change in actual height $h_{UAV}$ with a certain vertical control speed $V_{Cz}$. That is, the control signal may be configured to control propulsion assemblies 12 so as to propel movable object 10 in the vertical direction (e.g., up or down) at a vertical speed $V_{Dz}$ equal to the vertical control speed $V_{Cz}$ in order to achieve a change in actual height $h_{UAV}$ for reducing the difference $\Delta_h$ between the desired height $h_{REF}$ and the height measurement $h_m$.

In some embodiments, to ensure smooth, stable video capture the control signal may be configured to cause vertical movement of movable object 10 at a desired vertical control speed. For example, the user may supply an input (e.g., via terminal 26) indicative of a desired vertical control speed. In other embodiments, the desired vertical control speed may be a default vertical control speed, which may be stored in memory 36 or received via communication system 20. In other embodiments, height control module 42 may be configured to determine a desired control speed based on a map, algorithm, model, or other calculation based on one or more factors, such as the horizontal speed $V_{Dx}$, current vertical speed $V_{Dz}$, a detected obstacle in the path of movable object 10, a detected terrain feature (e.g., a hill, an incline, a depression, a cliff, a wall, etc.), or other input.

In other embodiments, control system 35 may be configured to determine a maximum vertical control speed $V_{Cz\_MAX}$ and generate a control signal configured to change the height of the moveable object based on the maximum vertical control speed $V_{Cz\_MAX}$ during target tracking and/or automatic height control. Control system 35 may be configured to determine the maximum control speed $V_{Cz\_MAX}$ based on the horizontal speed $V_{DX}$ of movable object 10. That is, the maximum control speed $V_{Cz\_MAX}$ may be determined based on the horizontal speed at which movable object 10 is following or tracking the target. The maximum control speed $V_{Cz\_MAX}$ may represent a maximum allowable vertical speed for adjusting the actual height $h_{UAV}$ of movable object 10. In some embodiments, the maximum control speed $V_{Cz\_MAX}$ may limit the vertical speed $V_{Dz}$ of movable object 10 in response to user input commands (e.g., generated via terminal 26). In other embodiments, the maximum control speed $V_{Cz\_MAX}$ may limit the vertical speed $V_{Dz}$ of movable object 10 during automatic control (e.g., feedback control) of the actual height $h_{UAV}$ of movable object 10.

In some embodiments, the vertical control speed (e.g., the default or user-selected vertical control speed) and/or the maximum vertical control speed $V_{Cz\_MAX}$ may be proportional to a product of a first vertical control scale factor $k_1$ and the horizontal speed $V_{DX}$ of movable object 10, as shown in the equation below.

$$V_{Cz\_MAX} = k_1 \times V_{Dx}$$

In some embodiments, the first vertical control scale factor $k_1$ may be determined empirically and stored within memory 36 for access by processor 38 during target tracking and/or automatic height control. In other embodiments, the first vertical control scale factor $k_1$ may be determined by control system 35 (e.g., by height control module 42) based on one or more factors, such as the current vertical speed $V_{Dz}$ of movable object 10, a detected obstacle in the path of movable object 10, a detected terrain feature (e.g., a hill, an incline, a depression, a cliff, a wall, etc.), or other input. In other embodiments, the first vertical control scale factor $k_1$ may be selected by a user. For example, the user may be allowed to supply a user input (e.g., via terminal 26) indicative of a desired first vertical control scale factor $k_1$ (e.g., a desired value for $k_1$), to choose from a list of preselected values for $k_1$, or to adjust the value of $k_1$ between a minimum value and a maximum value. Other ways of determining or providing input indicative of the first vertical control scale factor $k_1$ may be used.

By selecting the first vertical control scale factor $k_1$, the user may be able to control the speed with which movable object 10 moves in the vertical direction when the actual height $h_{UAV}$ of movable object 10 is automatically controlled (e.g., during target tracking). For example, when it is permissible to quickly change the height from which movable object 10 views the target, or when a more experienced operator is controlling movable object 10, a higher first vertical control scale factor $k_1$ may be selected. Conversely, when it is not permissible to quickly change the height from which movable object 10 view the target, or when the operator of movable object 10 has less experience, a lower first vertical control scale factor $k_1$ may be selected.

It is noted that word "first" as used herein with regard to the first vertical control scale factor $k_1$ is used only for purposes of convenience and clarity when distinguishing between multiple vertical control scale factors (e.g., to differentiate between first vertical control scale factor $k_1$ and a second vertical control scale factor $k_2$). Similarly, use of the word "second," "third," etc., with regard to other vertical control scale factors is only for purposes of convenience and distinction among vertical control scale factors in this description.

In some embodiments, it may be desirable to limit how much the actual height $h_{UAV}$ of movable object 10 is adjusted during target tracking and/or automatic height control. For instance, when the target moves over, under, or near terrain features or obstacles having a height or depth that extends above or below the ground surface, the height difference between the terrain feature or obstacle and the ground surface may cause the absolute value of the difference $\Delta_h$ between the height measurement $h_m$ and the desired height $h_{REF}$ of the UAV to increase. In response to this increase, control system 35 may change the actual height $h_{UAV}$ of movable object (e.g., using PID control, as described above) and subsequently readjust the actual height $h_{UAV}$ after movable object 10 passes the terrain feature or obstacle. These height adjustments can affect the quality of the optical data collected by sensory devices 19 and/or require great skill to counteract.

Figure 7A:
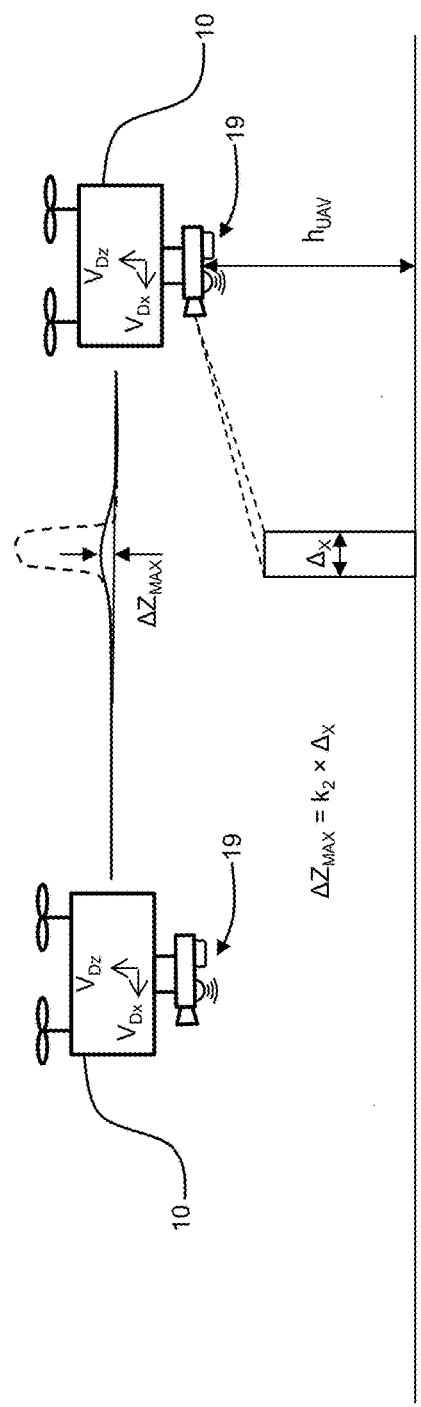
FIGS. 7A and 7B show exemplary tracking systems consistent with embodiments of the present disclosure.
Figure 7B:
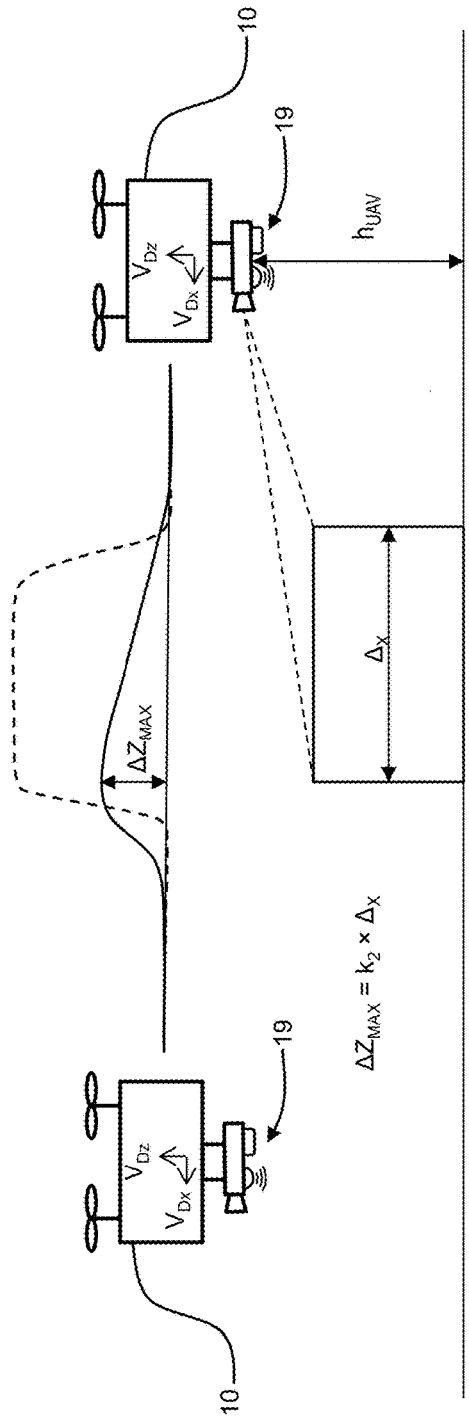
Figure 8:
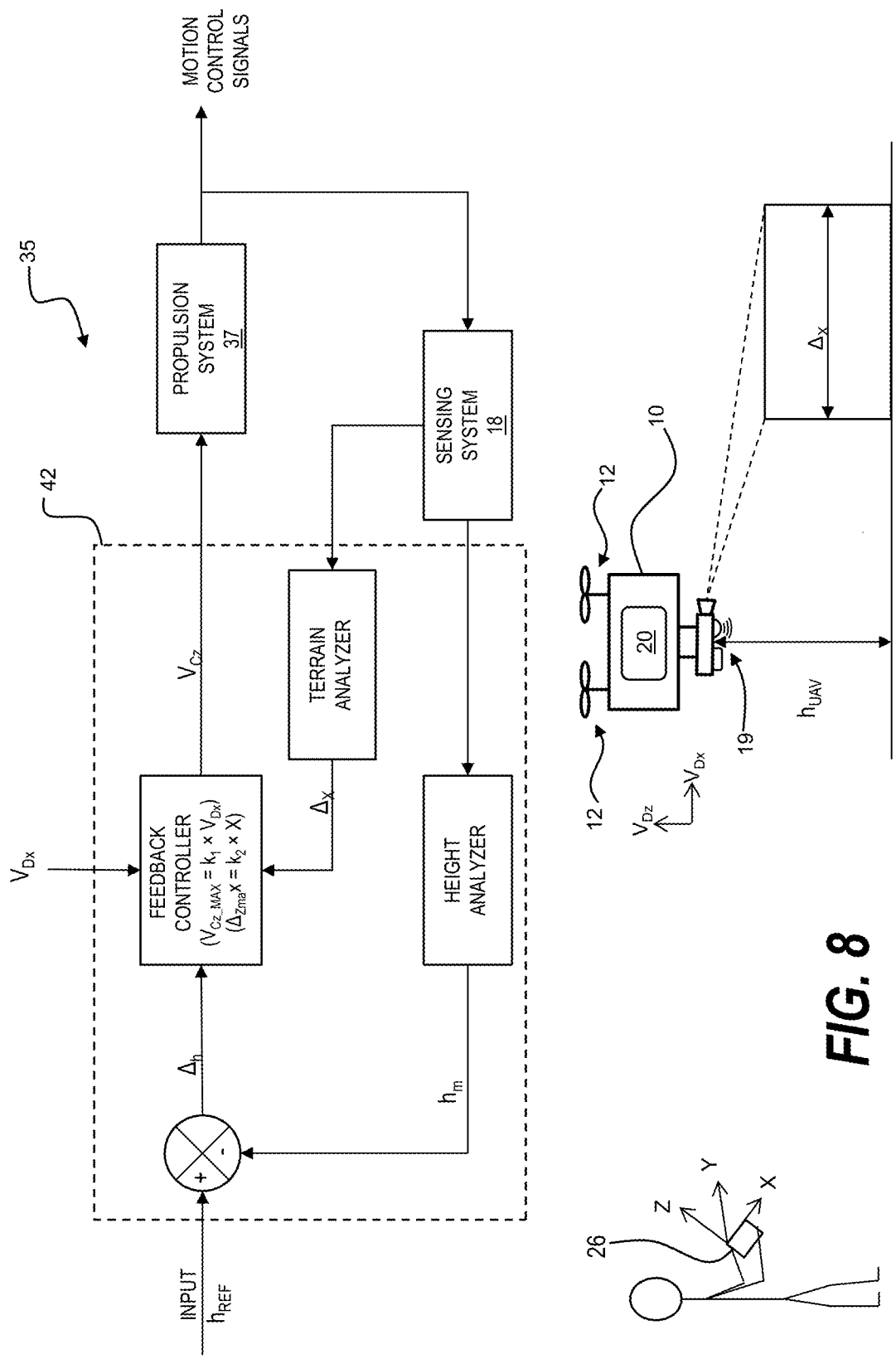
FIG. 8 is a diagrammatic illustration of an exemplary control system consistent with embodiments of the present disclosure.

To help reduce the extent to which control system 35 reacts to terrain features or obstacles in or near the flight path of movable object 10, control system 35 may be configured to determine a maximum allowable height change $\Delta_{Zmax}$ and generate control signals configured to change the actual height $h_{UAV}$ of movable object 10 based on the maximum allowable height change $\Delta_{Zmax}$. Referring now to FIGS. 7A, 7B, and 8, the maximum allowable height change $\Delta_{Zmax}$ may be determined based on a second vertical control scale factor $k_2$. The maximum allowable height change $\Delta_{Zmax}$ may also or alternatively be determined based on a terrain measurement, such as a horizontal length measurement $\Delta_X$ of a terrain feature or obstacle. For example, the maximum allowable height change $\Delta_{Zmax}$ may be proportional to the product of the second vertical control scale factor $k_2$ and the horizontal length measurement $\Delta_X$, as shown in the equation below.

$$\Delta_{Zmax}=k_2\times\Delta_X$$

In some embodiments, the second vertical control scale factor $k_2$ may be determined empirically and stored within memory 36 for access by processor 38 during target tracking and/or automatic height control. In other embodiments, the second vertical control scale factor $k_2$ may be determined by control system 35 (e.g., by processor 38 or height control module 42) based on one or more factors, such as the current vertical speed $V_{Dz}$ or horizontal speed $V_{DX}$ of movable object 10, a detected obstacle in the path of movable object 10, a detected terrain feature (e.g., a hill, an incline, a depression, a cliff, a wall, etc.), or other input. In other embodiments, the second vertical control scale factor $k_2$ may be selected by a user. For example, the user may be allowed to supply a user input (e.g., via terminal 26) indicative of a desired second vertical control scale factor $k_2$ (e.g., a desired value for $k_2$), to choose from a list of preselected values for $k_2$, or to adjust the value of $k_2$ between a minimum value and a maximum value. Other ways of determining or providing input indicative of the second vertical control scale factor $k_2$ may be used. In some embodiments, $k_2$ may be the same as or equal to $k_1$. In other embodiments, $k_1$ and $k_2$ may be different and/or determined separately.

By selecting the second vertical control scale factor $k_2$, the user may be able to control or limit the height change of movable object 10 when the actual height $h_{UAV}$ of movable object 10 is automatically controlled (e.g., during target tracking). For example, when it is permissible to allow movable object 10 to make greater height changes during target tracking, or when a more experienced operator is controlling movable object 10, a higher second vertical control scale factor $k_2$ may be selected. Conversely, when it is not permissible to allow movable object 10 to make large or drastic height changes during target tracking (i.e., when smaller height changes are preferred), or when the operator of movable object 10 has less experience, a lower second vertical control scale factor $k_2$ may be selected.

The terrain measurement may be generated using sensing system 18, including one or more sensory devices 19. For example, the terrain measurement may be generated using one or more devices, such as a camera (e.g., camera 44), infrared imaging devices, ultraviolet imaging devices, x-ray devices, ultrasonic imaging devices, radar devices, laser devices, etc. In some embodiments, the terrain measurement may be horizontal length measurement $\Delta_X$. Horizontal length measurement $\Delta_X$ may be or correspond to a length of the terrain feature or obstacle in the horizontal direction. For example, length measurement $\Delta_X$ may correspond to a length of a surface (e.g., a top, bottom, or side surface) or surface feature (e.g., a section of a surface, an elevated or depressed feature on a surface, etc.), an overall or maximum length, a diameter, a cross-sectional length, a depth, or other aspect of the terrain feature or obstacle.

With reference to FIG. 8, control system 35 may be configured to obtain a signal indicative of the terrain measurement from sensing system 18, as described above. In some embodiments, the signal indicative of the terrain measurement may correspond to a measurement value, such as horizontal length measurement $\Delta_X$. In other embodiments height control module 42 may include a terrain analyzer (e.g., a terrain analysis module) or otherwise be configured to process the signal indicative of the terrain measurement and generate a signal corresponding to the terrain measurement value (e.g., $\Delta_X$). Control system 35 or one of its components (e.g., height control module 42) may be configured to use the terrain measurement as an input for conducting feedback control of the actual height $h_{UAV}$ of movable object 10.

For example, control system 35 may be configured to automatically generate a control signal configured to change the actual height $h_{UAV}$ of the moveable object based on (or based further on) the terrain measurement (e.g., horizontal length measurement $\Delta_X$). For example, height control module 42 may include a feedback controller or otherwise be configured to generate a control signal using feedback control (e.g., PID control) to limit the height change of movable object 10 based on the maximum allowable height change $\Delta_{Zmax}$. The control signal generated by height control module 42 may be configured to control operation of propulsion system 18 in order to permit a height change within the maximum allowable height change $\Delta_{Zmax}$. That is, the control signal may be configured to control propulsion assemblies 12 so as to propel movable object 10 in the vertical direction (e.g., up or down) at a vertical speed $V_{Dz}$ equal to the vertical control speed $V_{Cz}$, but within the maximum allowable height change $\Delta_{Zmax}$, in order to achieve a change in actual height $h_{UAV}$ for reducing the difference $\Delta_h$ between the desired height $h_{REF}$ and the height measurement $h_m$.

Thus, the disclosed control system may be able to automatically adjust the actual height $h_{UAV}$ of movable object 10 during target tracking, thereby simplifying control of movable object 10, enabling higher quality optical data to be collected, and reducing the level of skill and experience needed to effectively operate movable object 10. The disclosed control system may also be able to control the speed with which height adjustments of movable object 10 are made during target tracking, thereby improving the quality of collected optical data and simplifying height control of movable object 10. The disclosed control system may also be able to control the maximum height adjustment of movable object 10 during target tracking, thereby limiting the amount of subsequent correction that needed to restore the height of movable object 10 to the desired height for target tracking.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope being indicated by the following claims and their equivalents

What is claimed is:

1. A method of controlling a movable object to track a target, comprising:
    determining a difference between a desired height and a measured height of the movable object;
    determining a horizontal speed of the movable object or the target;
    determining a vertical control speed based on the horizontal speed and a vertical control scale factor, the vertical control speed being proportional to the horizontal speed, and the vertical control scale factor being determined according to at least one of factors including a detected terrain feature, a measured vertical speed of the movable object, detected obstructions in a path of the movable object, or a selection operation of an operator of the movable object; and
    controlling the movable object by adjusting the movable object based on:
        the difference between the desired height and the measured height; and
        the vertical control speed.

2. The method of claim 1, wherein adjusting the movable object includes adjusting one or more movement characteristics of the movable object to reduce the difference between the desired height and the measured height.

3. The method of claim 1, wherein adjusting the movable object comprises controlling movement of the moveable object based on a maximum vertical control speed.

4. The method of claim 1,
    wherein the vertical control scale factor is a first vertical control scale factor;
    the method further comprising:
        determining an allowable height change based on at least one of a second vertical control scale factor or a terrain measurement.

5. The method of claim 4, wherein the terrain measurement corresponds to a length of a surface feature of an object on a ground.

6. The method of claim 4, wherein determining the allowable height change comprises determining the allowable height change to be proportional to the terrain measurement.

7. The method of claim 4, wherein adjusting the movable object comprises controlling movement of the moveable object based on a maximum allowable height change.

8. A system for controlling a movable object to track a target, comprising:
    a memory storing instructions; and
    a controller having a processor configured to execute the instructions to:
        determine a difference between a desired height and a measured height of the movable object;
        determine a horizontal speed of the movable object or the target;
        determine a vertical control speed based on the horizontal speed and a vertical control scale factor, the vertical control speed being proportional to the horizontal speed, and the vertical control scale factor being determined according to at least one of factors including a detected terrain feature, a measured vertical speed of the movable object, detected obstructions in a path of the movable object, or a selection operation of an operator of the movable object; and
        control the movable object by adjust the moveable object based on:
            the difference between the desired height and the measured height; and
            the vertical control speed.

9. The system of claim 8, wherein the processor is further configured to execute the instructions to control movement of the moveable object based on at least one of the vertical control speed or an allowable height change.

10. The system of claim 8, wherein:
    the vertical control scale factor is a first vertical control scale factor; and
    the processor is further configured to execute the instructions to determine an allowable height change based on at least one of a second vertical control scale factor or a terrain measurement.

11. An unmanned aerial vehicle (UAV), comprising:
    a propulsion device;
    a memory storing instructions;
    a controller in communication with the propulsion device and configured to control the UAV to track a target object, the controller comprising a processor configured to execute the instructions to:
        determine a difference between a desired height and a measured height of the UAV;
        determine a horizontal speed of the UAV or the target;
        determine a vertical control speed based on the horizontal speed and a vertical control scale factor, the vertical control speed being proportional to the horizontal speed, and the vertical control scale factor is determined according to at least one of factors including a detected terrain feature, a measured vertical speed of the UAV, detected obstructions in a path of the UAV, or a selection operation of an operator of the UAV; and
        control the UAV by adjust the UAV based on:
            the difference between the desired height and the measured height; and
            the vertical control speed.

12. The UAV of claim 11, wherein the processor is configured to execute the instructions to adjust the UAV by controlling movement of the UAV based on the vertical control speed.

13. The UAV of claim 11, wherein:
    the vertical control scale factor is a first vertical control scale factor; and
    the processor is configured to execute the instructions to adjust the UAV by controlling movement of the UAV based on an allowable height change that is based on at least one of a second vertical control scale factor or a terrain measurement.

14. The UAV of claim 13, wherein the terrain measurement is generated by one or more of a camera, an infrared imaging device, an ultraviolet imaging device, an x-ray device, an ultrasonic imaging device, a radar device, and a laser device.

15. The method of claim 1, wherein the vertical control speed is proportional to the horizontal speed with the vertical control scale factor.

\* \* \* \* \*